(12) United States Patent
Takahata et al.

(10) Patent No.: US 9,337,490 B2
(45) Date of Patent: May 10, 2016

(54) LITHIUM ION SECONDARY BATTERY

(75) Inventors: Koji Takahata, Toyota (JP); Machiko Abe, Okazaki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 94 days.

(21) Appl. No.: 14/234,748

(22) PCT Filed: Jul. 29, 2011

(86) PCT No.: PCT/JP2011/067536
§ 371 (c)(1),
(2), (4) Date: Jan. 24, 2014

(87) PCT Pub. No.: WO2013/018181
PCT Pub. Date: Feb. 7, 2013

(65) Prior Publication Data
US 2014/0154579 A1    Jun. 5, 2014

(51) Int. Cl.
| | |
|---|---|
| *H01M 4/04* | (2006.01) |
| *H01M 4/1393* | (2010.01) |
| *H01M 4/583* | (2010.01) |
| *H01M 4/587* | (2010.01) |
| *H01M 10/0525* | (2010.01) |
| *H01M 4/36* | (2006.01) |

(52) U.S. Cl.
CPC .......... *H01M 4/583* (2013.01); *H01M 4/0404* (2013.01); *H01M 4/1393* (2013.01); *H01M 4/366* (2013.01); *H01M 4/587* (2013.01); *H01M 10/0525* (2013.01); *Y02E 60/122* (2013.01); *Y02P 70/54* (2015.11); *Y02T 10/7011* (2013.01)

(58) Field of Classification Search
CPC . H01M 4/1393; H01M 4/366; H01M 4/0404; H01M 4/583; H01M 10/0525; Y02T 10/7011; Y02E 60/122
See application file for complete search history.

(56) References Cited

U.S. PATENT DOCUMENTS

| | | | |
|---|---|---|---|
| 2008/0102376 A1* | 5/2008 | Kato et al. | ............ 429/332 |
| 2008/0274406 A1 | 11/2008 | Fuse et al. | |
| 2009/0181311 A1* | 7/2009 | Iwanaga et al. | ............ 429/331 |
| 2009/0311599 A1 | 12/2009 | Kawai et al. | |
| 2011/0143216 A1 | 6/2011 | Yoshida et al. | |
| 2011/0262802 A1 | 10/2011 | Uono et al. | |
| 2013/0130117 A1* | 5/2013 | Yamamoto et al. | ....... 429/231.8 |

FOREIGN PATENT DOCUMENTS

| | | |
|---|---|---|
| JP | 7-235294 | 9/1995 |
| JP | 10-255770 | 9/1998 |
| JP | 10-302774 | 11/1998 |
| JP | 2001-229914 | 8/2001 |
| JP | 2002-241117 | 8/2002 |

(Continued)

*Primary Examiner* — Brittany Raymond
(74) *Attorney, Agent, or Firm* — Finnegan, Henderson, Farabow, Garrett & Dunner, LLP

(57) ABSTRACT

A lithium ion secondary battery 100A has negative electrode active material particles 710A which include graphite particles that are at least partially covered by an amorphous carbon film 750. The negative electrode, active material particles 710A have a TG weight-loss-on-heating onset temperature T1 which satisfies the condition 500° C.≤T1≤615° C. and a micro-Raman G-band half-width Gh which satisfies the condition 20≤Gh≤28. This configuration makes it possible to obtain a lithium ion secondary battery 100A in which the reaction resistance in a low-temperature environment can be kept low.

8 Claims, 11 Drawing Sheets

(56) References Cited

FOREIGN PATENT DOCUMENTS

| | | |
|---|---|---|
| JP | 2010-251060 | 11/2004 |
| JP | 2006-49286 | 2/2006 |
| JP | 2008-16242 | 1/2008 |
| JP | 2009-004304 | 1/2009 |
| JP | 2010-92649 | 4/2010 |
| JP | 2010-135314 | 6/2010 |
| JP | 2011-142066 | 7/2011 |
| WO | WO 2007/139130 | 12/2007 |

* cited by examiner

US 9,337,490 B2

LITHIUM ION SECONDARY BATTERY

CROSS-REFERENCE TO RELATED APPLICATIONS

This application is a national phase application of International Application No. PCT/JP2011/067536, filed Jul. 29, 2011, the content of which is incorporated herein by reference.

TECHNICAL FIELD

The invention relates to a lithium ion secondary battery. In this description, "secondary battery" refers generally to electrical storage devices which can be repeatedly charged. Also, in this description, "lithium ion secondary battery" refers to secondary batteries which use lithium ions as the electrolyte ions and in which charging and discharging is achieved by the movement of electrons associated with lithium ions between a positive electrode and a negative electrode.

BACKGROUND ART

With regard to such lithium ion secondary batteries, the use of a carbonaceous negative electrode active material having an oil absorption of 65 mL/100 g or less has been disclosed in Patent Document 1.

Also, Patent Document 2 discloses the use of graphite having a Raman half-width of less than 25 cm$^{-1}$.

CITATION LIST

Patent Literature

Patent Document 1: Japanese Patent Application Laid-open No. H10-302774 (JP 1998-302774 A)
Patent Document 2: Japanese Patent Application Laid-open No. H07-235294 (JP 1995-235294 A)

SUMMARY OF INVENTION

Technical Problem

Lithium ion secondary batteries have come to be installed in automobiles as one source of power for the mechanisms that drive the automobile. In such applications as batteries for driving vehicles, the environment sometimes changes with movement of the vehicle or the battery may be left standing outdoors where temperature changes can be severe. Accordingly, there exists a desire that the battery maintain the required performance even when exposed to changes in the temperature environment. Unfortunately, this has not been taken into account in the conventional art cited above. From the standpoint of changes in the temperature environment, in low-temperature environments in particular, lithium ion reactions slow down and the resistance of a lithium ion secondary battery has a tendency to rise. Given that vehicles are used in cold regions, there is a desire that lithium ion secondary batteries be able to hold down the reaction resistance in low-temperature environments at about −30° C.

Solution to Problem

The lithium ion secondary battery according to the invention has negative electrode active material particles which include graphite particles that are at least partially covered with an amorphous carbon film. The negative electrode active material particles have a TG weight-loss-on-heating onset temperature T1 which satisfies the condition 500° C.≤T1≤615° C. and a micro-Raman G-band half-width Gh which satisfies the condition 20≤Gh≤28. A lithium ion secondary battery endowed with an excellent reaction resistance in a low-temperature environment is thereby obtained.

In addition, the negative electrode active material particles may have a linseed oil absorption which satisfies the condition F≥50 mL/100 g. This enables the high-rate discharge resistance rise ratio (high-rate discharge deterioration ratio) of a lithium ion secondary battery to be kept low. In addition, the negative electrode active material particles 710A may have a linseed oil absorption F which satisfies the condition F≤64 mL/100 g. This makes it possible to obtain a lithium ion secondary battery which is capable of maintaining a high capacity even when left to stand for a long time.

DESCRIPTION OF EMBODIMENTS

First, an example of the construction of a lithium ion secondary battery is described. Then, while suitably referring to this example construction, a lithium ion secondary battery according to one embodiment of the invention is described. Members or features having like functions are designated by same symbol. The diagrams are drawn schematically, and do not necessarily reflect actual dimensions. The diagrams each show only examples and, unless stated otherwise, do not limit the scope of the invention.

Figure 1:
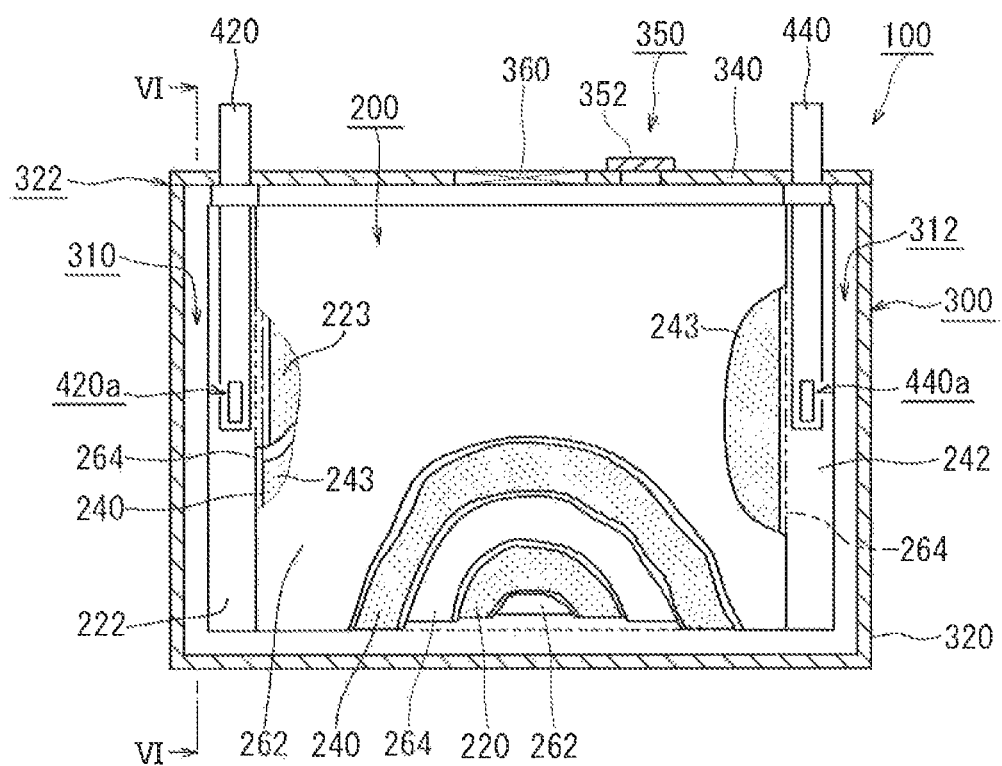
FIG. 1 is a diagram showing an example of the structure of a lithium ion secondary battery.
Figure 2:
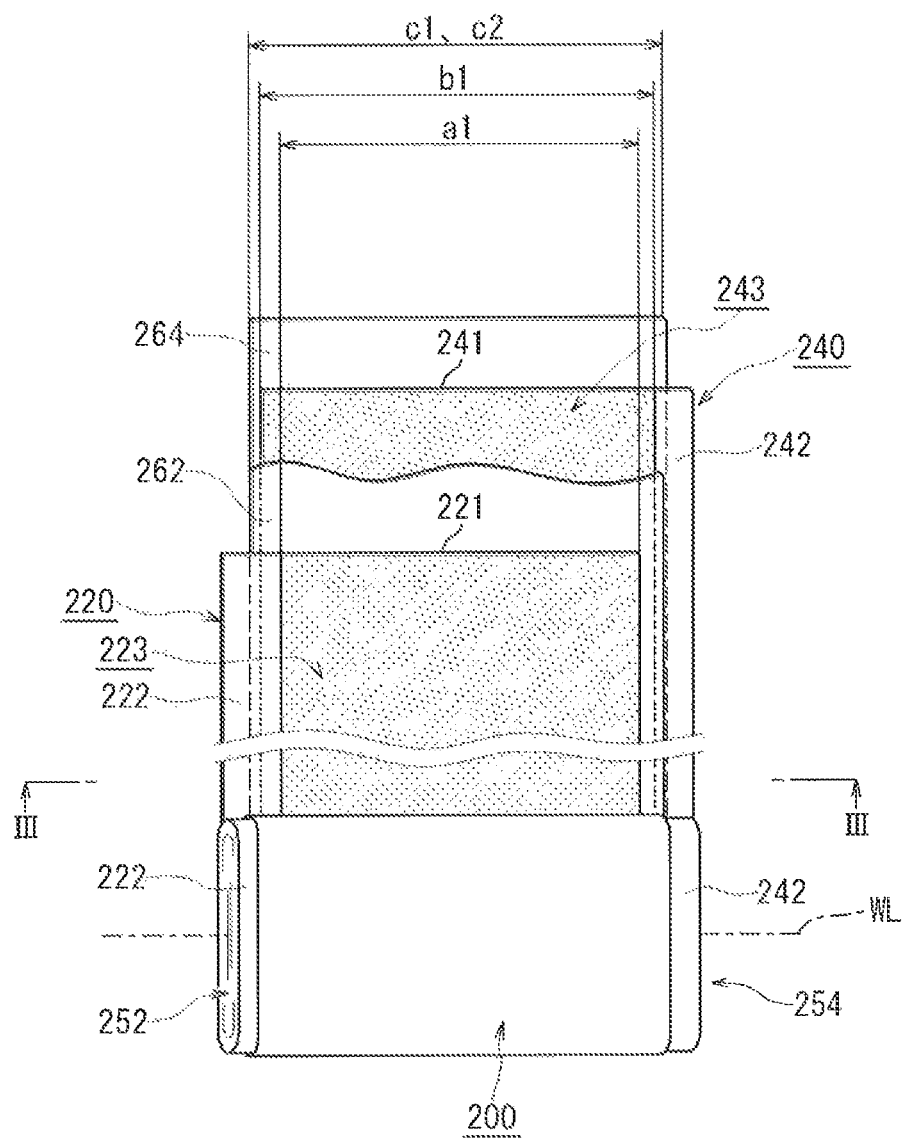
FIG. 2 is a diagram showing a coiled electrode assembly for a lithium ion secondary battery.
Figure 3:
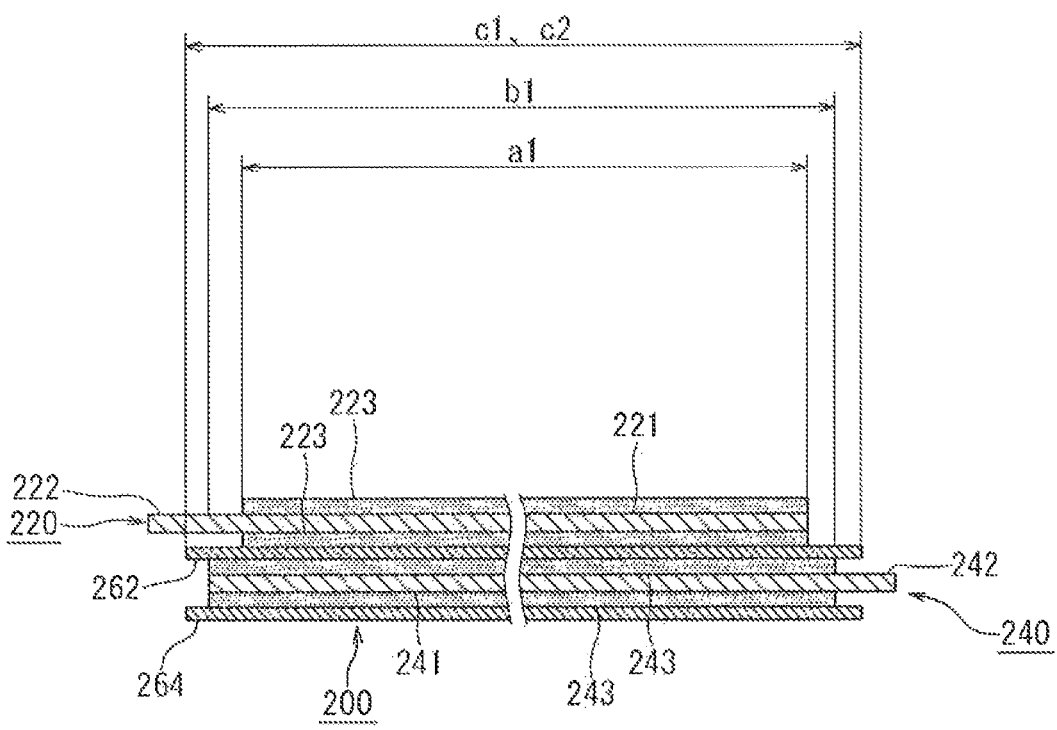
FIG. 3 is a sectional view taken along III-III in FIG. 2.

FIG. 1 shows a lithium ion secondary battery 100. This lithium ion secondary battery 100 has a coiled electrode assembly 200 and a battery case 300 as shown in FIG. 1. FIG. 2 is a diagram showing the coiled electrode assembly 200. FIG. 3 shows a cross-section taken along III-III in FIG. 2.

The coiled electrode assembly 200 has, as shown in FIG. 2, a positive electrode sheet 220, a negative electrode sheet 240, and separators 262 and 264. The positive electrode sheet 220, the negative electrode sheet 240, and the separators 262 and 264 are each strips of sheet materials.

Positive Electrode Sheet 220

The positive electrode sheet 220 has a positive electrode current collector 221 and a positive electrode active material layer 223, each in the form of strips. A metal foil suitable for the positive electrode may be preferably used as the positive electrode current collector 221. For example, a strip of aluminum foil having a predetermined width and a thickness of about 15 μm may be used as the positive electrode current collector 221. An uncoated region 222 is established along the edge on one side in the width direction of the positive electrode current collector 221. In the illustrated example, positive electrode active material layers 223, as shown in FIG. 3, are held on both surfaces of the positive electrode current collector 221, except in the uncoated region 222 established on the positive electrode current collector 221. A positive electrode active material is included in the positive electrode active material layers 223. The positive electrode active material layers 223 are formed by coating a positive electrode active material-containing positive electrode mixture onto the positive electrode current collector 221.

Positive Electrode Active Material Layers 223 and Positive Electrode Active Material Particles 610

Figure 4:
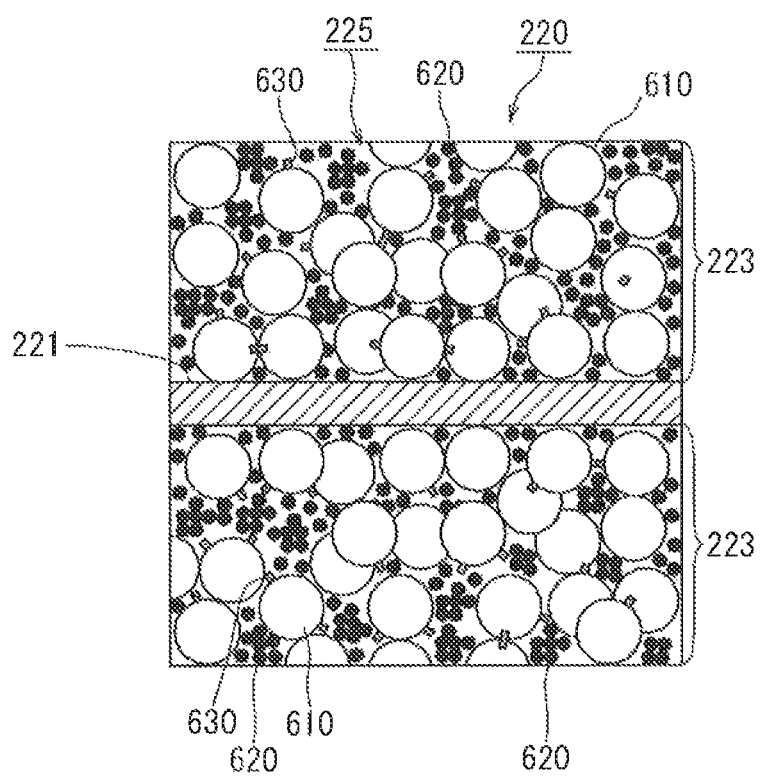
FIG. 4 is a cross-sectional view showing the structure of a positive electrode active material layer.

FIG. 4 is a cross-sectional view of the positive electrode sheet 220. In FIG. 4, the positive electrode active material particles 610, conductive material 620 and the binder 630 within the positive electrode active material layers 223 are shown large and schematically so as to clarify the structure of the positive electrode active material layers 223. The positive electrode active material layers 223 include, as shown in FIG. 4, positive electrode active material particles 610, a conductive material 620 and a binder 630.

A substance capable of use as the positive electrode active material in a lithium ion secondary battery may be used in the positive electrode active material particles 610. Illustrative examples of positive electrode active material particles 610 include lithium-transition metal oxides such as $LiNiCoMnO_2$ (lithium nickel cobalt manganese composite oxide), $LiNiO_2$ (lithium nickelate), $LiCoO_2$ (lithium cobaltate) $LiMn_2O_4$ (lithium manganate) and $LiFePO_4$ (lithium iron phosphate). Here, $LiMn_2O_4$ has, for example, a spinel structure. Also, $LiNiO_2$ or $LiCoO_2$ has a layered rock salt structure. $LiFePO_4$ has, for example, an olivine structure. The $LiFePO_4$ with an olivine structure may be, for example, nanometer order particles. Alternatively, the $LiFePO_4$ with an olivine structure may be additionally coated with a carbon film.

Conductive Material 620

The conductive material 620 is exemplified by carbon materials such as carbon powder and carbon fibers. The conductive material 620 may be of a single type selected from among these conductive materials and used alone, or may be of two or more types used in combination. The carbon powder used may be, for example, any of various carbon blacks (e.g., acetylene black, oil furnace black, graphitized carbon black, carbon black, graphite, ketjen black), or may be a graphite powder.

Binder 630

The binder 630 binds together the positive electrode active material particles 610 and particles of the conductive material 620 which are included in the positive electrode active material layers 223, or binds these particles with the positive electrode current collector 221. A polymer which is capable of dissolving or dispersing in the solvent used may be utilized as such a binder 630. For, example, in a positive electrode mixture composition that uses an aqueous solvent, preferred use can be made of water-soluble or water-dispersible polymers such as cellulosic polymers (e.g., carboxymethylcellulose (CMC), hydroxypropyl methylcellulose (HPMC)), polyvinyl alcohol (PVA), fluoroplastics (e.g., polytetrafluoroethylene (PTFE), tetrafluoroethylene-hexafluoropropylene copolymers (FEP)), vinyl acetate copolymers, and rubbers (e.g., styrene-butadiene copolymers (SBR), and acrylic acid-modified SBR resins (SBR latex)). In a positive electrode mixture composition that uses a nonaqueous solvent, preferred use can be made of a polymer (e.g., polyvinylidene fluoride polyvinylidene chloride (PVDC), polyacrylonitrile (PAN)).

Thickener, Solvent

To form the positive electrode active material layers 223, a positive electrode mixture is prepared by mixing together the above-described positive electrode active material particles 610 and the conductive material 620 within a solvent to form a paste (slurry), then coating the mixture onto the positive electrode current collector 221, followed by drying and rolling. Either an aqueous solvent or a nonaqueous solvent may be used at this time as the solvent in the positive electrode mixture. A preferred example of a nonaqueous solvent is N-methyl-2-pyrrolidone (NMP). The polymer materials mentioned above as the binder 630 may be used to manifest not only the function of a binder, but also the functions of a thickener and other additives in the positive electrode mixture.

The weight ratio of the positive electrode active material as a proportion of the overall positive electrode mixture is, in general, preferably at least about 50 wt % (typically from 50 to 95 wt %), and more preferably from about 70 to about 95 wt % (e.g., 75 to 90 wt %). The ratio of the conductive material as a proportion of the overall positive electrode mixture may be set to from about 2 to about 20 wt %; it is generally preferable to set this ratio to from about 2 to about 15 wt %, In a composition in which binder is used, the ratio of binder as a proportion of the overall positive electrode mixture may be set to from about 1 to about 10 wt %; it is generally preferable to set this ratio to from about 2 to about 5 wt %.

Negative Electrode Sheet 240

The negative electrode sheet 240 has, as shown in FIG. 2, a negative electrode current collector 241 and a negative electrode active material layer 243, each in the form of a strip. A metal foil suitable for the negative electrode may be advantageously used as the negative electrode current collector 241. For example, a strip of copper foil having a predetermined width and a thickness of about 10 μm may be used as the negative electrode current collector 241. An uncoated region 242 is established along the edge on one side in the width direction of the negative electrode current collector 241. Negative electrode active material layers 243 are formed on both surfaces of the negative electrode current collector 241, except in the uncoated region 242 established on the negative electrode current collector 241. The negative electrode active material layers 243 are held on the negative electrode current collector 241, and include at least a negative electrode active material. The negative electrode active material layers 243 are formed by coating a negative electrode active material-containing negative electrode mixture onto the negative electrode current collector 241.

Negative Electrode Active Material Layer 243

Figure 5:
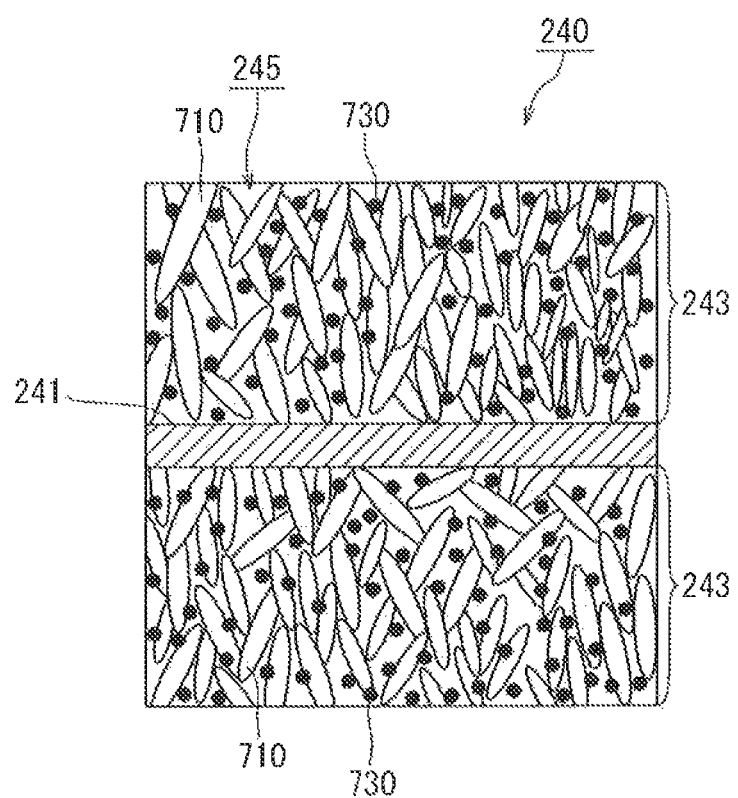
FIG. 5 is a cross-sectional view showing the structure of a negative electrode active material layer.

FIG. 5 is a cross-sectional view of the negative electrode sheet 240 in a lithium ion secondary battery 100. The negative electrode active material layers 243 include, as shown in FIG. 5, negative electrode active material particles 710, a thickener (not shown), a binder 730 and the like. In FIG. 5, the negative electrode active material particles 710 and the binder 730 within the negative electrode active material layer 243 are shown large and schematically so as to clarify the structure of the negative electrode active material layers 243.

Negative Electrode Active Material Particles 710

One, two or more types of materials hitherto used in lithium ion secondary batteries may be used without particular limitation as the negative electrode active material particles 710. Such materials are exemplified by particulate carbon materials (carbon particles) containing in at least some portion thereof a graphite structure (layer structure). More specifically, the negative electrode active material may be natural graphite, natural graphite coated with an amorphous carbon material, graphite, non-graphitizable carbon (hard carbon), graphitizable carbon (soft carbon), or a carbon material that is a combination thereof. Of these, a case in which flake graphite was used as the negative electrode active material particles 710 is shown in the diagrams, although the negative electrode active material particles 710 are not limited to the illustrated example.

Thickener, Solvent

To form the negative electrode active material layers 243, a negative electrode mixture is prepared by mixing together the above-described negative electrode active material particles 710 and the binder 730 within a solvent to form a paste (slurry), then coating the mixture onto the negative electrode current collector 241, followed by drying and rolling. Either an aqueous solvent or a nonaqueous solvent may be used at this time as the solvent in the negative electrode mixture. A preferred example of a nonaqueous solvent is N-methyl-2-pyrrolidone (NMP), The polymer materials mentioned above as the binder 630 for the positive electrode active material layers 223 (see FIG. 4) may be used as the binder 730. Also, the polymer materials mentioned above as the binder 630 for the positive electrode active material layers 223 may be used to manifest not only the function of a binder, but also the functions of a thickener and other additives in the negative electrode mixture.

Separators 262 and 264

The separators 262 and 264 are, as shown in FIGS. 1 and 2, components which separate the positive electrode sheet 220 and the negative electrode sheet 240. In this example, the separators 262 and 264 are strips of sheet material of predetermined width which have a plurality of small pores.a Separators which have a single-layer construction or a multilayer construction and are composed of, for example, a porous polyolefin resin may be used as the separators 262 and 264. In this example, as shown in FIGS. 2 and 3, the negative electrode active material layers 243 have a width bi which is a little wider than the width a1 of the positive electrode active material layers 223. In addition, the separators 262 and 264 have respective widths c1, c2 which are a little wider than the width hi of the negative electrode active material layers 243 (c1, c2>b1>a1).

In the embodiment shown in FIGS. 1 and 2, the separators 262 and 264 are composed of sheet-like members. The separators 262 and 264 are members which both insulate between the positive electrode active material layers 223 and the negative electrode active material layers 243, and also allow the movement of electrolyte therebetween. Hence, these are not limited to sheet-like members. Instead of sheet-like members, the separators 262 and 264 may each be composed of, for example, a layer of particles with insulating properties that has been formed on the surface of the positive electrode active material layer 223 or the negative electrode active material layer 243. Here, the particles with insulating properties may be composed of an inorganic filler having insulating properties (e.g., a filler such as a metal oxide or a metal hydroxide), or the particles may be resin particles having insulating properties (e.g., particles of for example, polyethylene, polypropylene or the like).

Battery Case 300

In this example, the battery case 300 is, as shown in FIG. 1, a so-called prismatic battery case, and has a container body 320 and a lid 340. The container body 320 is a flat box-like container in the shape of a square tube closed on the bottom and open on one side (the top side). The lid 340 is a member which attaches to the opening on top of the container body 320, closing the opening.

in secondary batteries for installation in vehicles, to increase the fuel efficiency of the vehicle, there exists a desire to increase the weight-to-energy efficiency (capacity of the battery per unit weight). Accordingly, in this embodiment, a lightweight metal such as aluminum or an aluminum alloy is used in the container body 320 and the lid 340 which make up the battery case 300. By doing so, the weight-to-energy efficiency can be increased.

The battery case 300 has a flat, square interior space that serves as the space for housing the coiled electrode assembly 200. As shown in FIG. 1, the flat interior space of the battery case 300 is a little wider than the width of the coiled electrode assembly 200. In this embodiment, the battery case 300 has a container body 320 in the shape of a square tube closed on the bottom, and a lid 340 which closes the opening in the container body 320. Also, electrode terminals 420 and 440 are attached to the lid 340 of the battery case 300. The electrode terminals 420 and 440 pass through the battery case 300 (lid 340) and emerge outside of the battery case 300. In addition, an electrolyte injection hole 350 and a safety valve 360 are provided in the lid 340.

Figure 6:
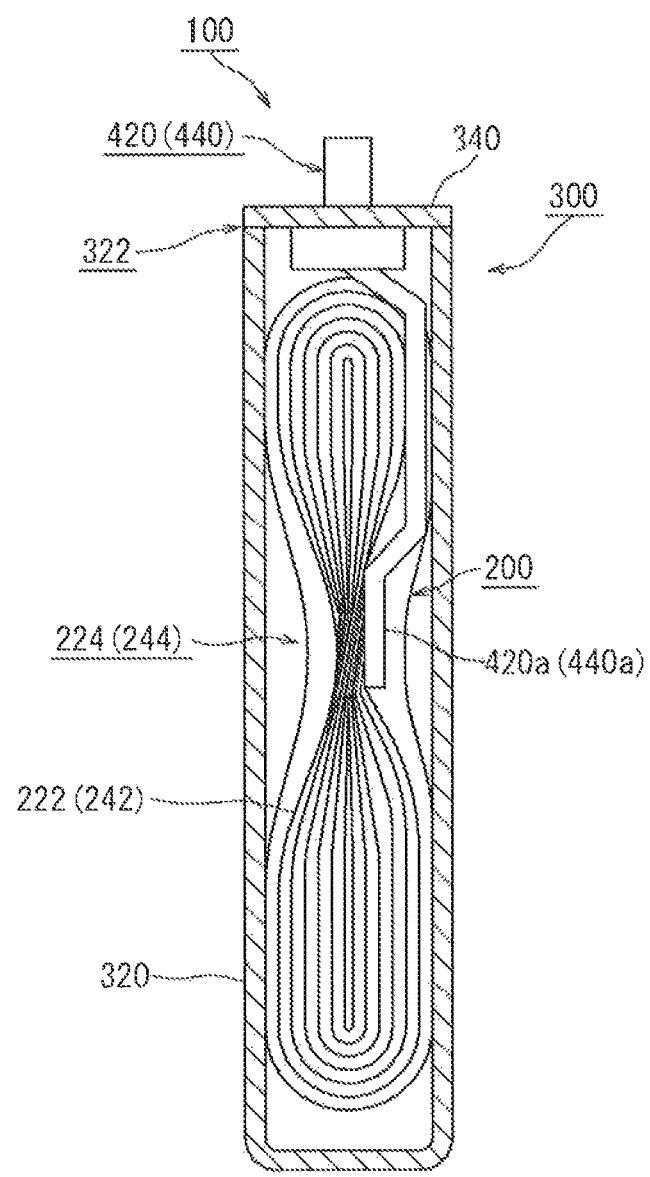
FIG. 6 is a side view showing the welding site between an uncoated region of the coiled electrode assembly and an electrode terminal.

The coiled electrode assembly 200, as shown in FIG. 2, has been bent and flattened under an applied force in a direction perpendicular to the coiling axis WL. In the example shown in FIG. 2, an uncoated region 222 of the positive electrode current collector 221 and an uncoated region 242 of the negative electrode current collector 241 are helically exposed on both sides of, respectively, the separators 262 and 264. As shown in FIG. 6, in this embodiment, the middle portions 224 and 244 of uncoated regions 222 and 242 are gathered together and welded to the tips 420a and 440a of the electrode terminals 420 and 440. At this time, due to differences in the respective materials, a technique such as ultrasonic welding is used to weld together the electrode terminal 420 and the positive electrode current collector 221, and a technique such as resistance welding is used to weld together the electrode terminal 440 and the negative electrode current collector 241. FIG. 6 is a side view showing the welding site between the middle portion 224 (244) of an uncoated region 222 (242) of the coiled electrode assembly 200 and an electrode terminal 420 (440), and is a cross-sectional view taken along VI-VI in FIG. 1.

The coiled electrode assembly 200 is attached, in the bent and flattened state, to the electrode terminals 420 and 440 which have been fixed to the lid 340. This coiled electrode assembly 200 is, as shown in FIG. 1, housed in the flat internal space of the container body 320. After the coiled electrode assembly 200 has been placed therein, the container body 320 is closed with the lid 340. The joint 322 (see FIG. 1) between the lid 340 and the container body 320 is welded and sealed by laser welding or the like. In this example, the coiled electrode assembly 200 is positioned within the battery case 300 by the electrode terminals 420 and 440 that have been fixed to the lid 340 (battery case 300).

Electrolyte

Next, an electrolyte is injected into the battery case 300 through the electrolyte injection hole 330 provided in the lid 340. An electrolyte in which water does not serve as the solvent, that is, a nonaqueous electrolyte, is used as the electrolyte. The electrolyte used in this example is obtained by including $LiPF_6$ to a concentration of about 1 mol/L within a mixed solvent of ethylene carbonate and diethyl carbonate (e.g., a mixed solvent having a volumetric ratio of about 1:1). Next, a sealing cap 352 made of metal is attached (such as by welding) to the electrolyte injection hole 350, thereby sealing the battery case 300. The electrolyte is not limited to the electrolyte mentioned here by way of illustration. For example, nonaqueous electrolytes that have hitherto been used in lithium ion secondary batteries may be suitably used here as the electrolyte.

Pores

The positive electrode active material layers 223 have small gaps 225 (see FIG. 4) which might also be called cavities between the positive electrode active material particles 610, particles of the conductive material 620 and the like. The electrolyte (not shown) is able to infiltrate into these small gaps in the positive electrode active material layers 223. Similarly, the negative electrode active material layers 243 have small gaps 245 (see FIG. 5) which might also be called cavities between, for example, the negative electrode active material particles 710. These gaps 225 and 245 (cavities) are suitably referred to here as "pores." In the coiled electrode assembly 200, as shown in FIG. 2, the uncoated regions 222 and 242 are helically coiled on both sides along the coiling axis WL. Electrolyte is able to infiltrate through gaps in the uncoated regions 222 and 242 on both sides 252 and 254 along this coiling axis WL. The electrolyte thereby penetrates throughout the positive electrode active material layers 223 and the negative electrode active material layers 243 at the interior of the lithium ion secondary battery 100.

Gas-Venting Paths in this example, the flat interior space of the battery case 300 is a little wider than the coiled electrode assembly 200 which has been flattened. On both sides of the coiled electrode assembly 200, gaps 310 and 312 are provided between the coiled electrode assembly 200 and the battery case 300. The gaps 310 and 312 serve as paths for venting gases. In cases where overcharging has occurred, for example, the temperature of the lithium ion secondary battery 100 becomes abnormally high, whereupon the electrolyte decomposes and the abnormal generation of gas may occur. In this embodiment, such abnormally generated gases move toward the safety valve 360 by passing through the gaps 310 and 312 between the coiled electrode assembly 200 and the battery case 300 on both sides of the coded electrode assembly 200, and are discharged outside of the battery case 300 through the safety valve 360.

In this lithium ion secondary battery 100, the positive electrode current collector 221 and the negative electrode current collector 241 are electrically connected to an external device via the electrode terminals 420 and 440 which pass through the battery case 300. The operation of the lithium ion secondary battery 100 during charging and discharging is described below.

Operation During Charging

Figure 7:
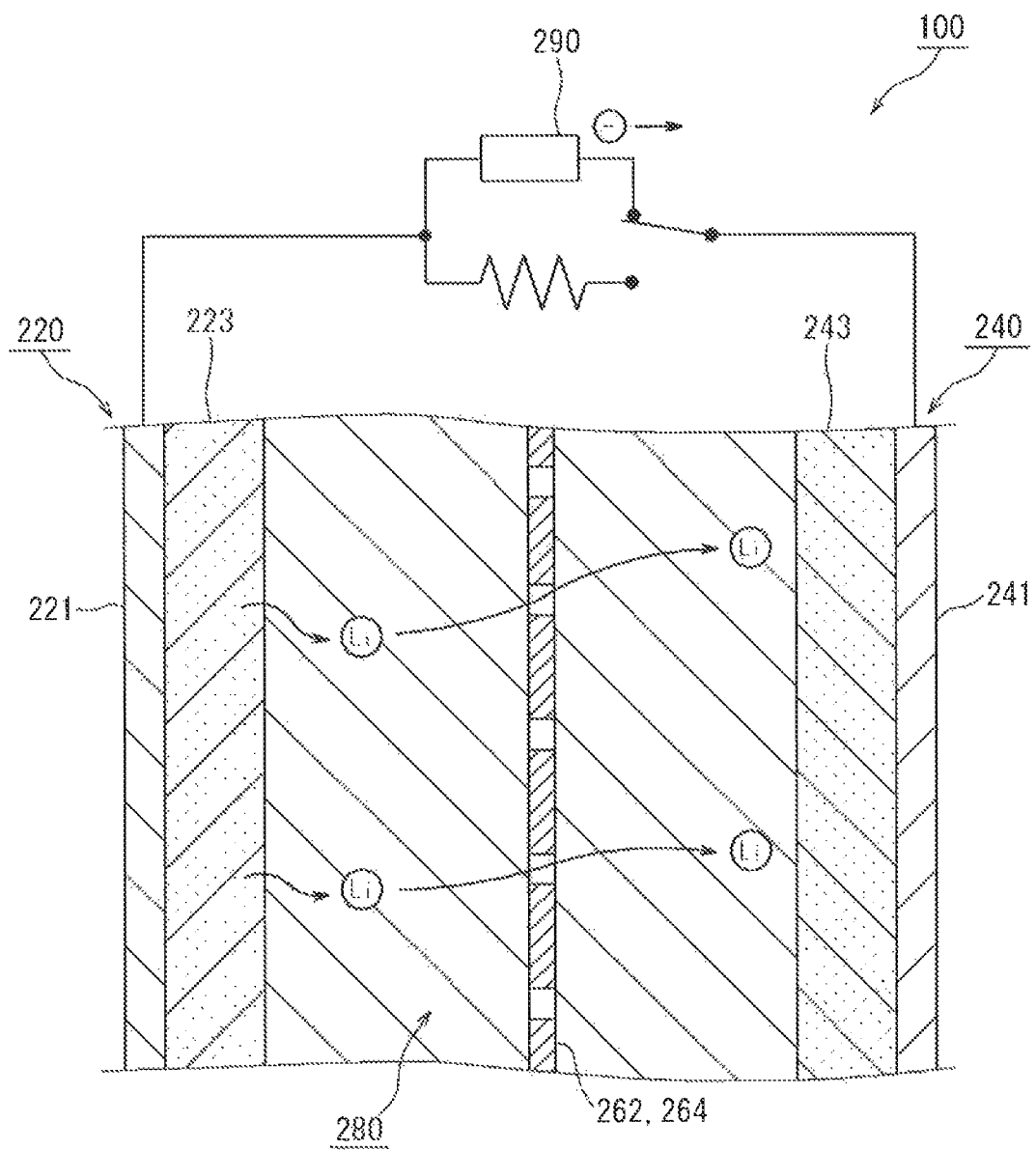
FIG. 7 is a schematic view showing the state of a lithium ion secondary battery during charging.

FIG. 7 schematically shows the state during charging of the lithium ion secondary battery 100. During charging, as shown in FIG. 7, the electrode terminals 420 and 440 of the lithium ion secondary battery 100 (see FIG. 1) are connected to a charger 290. Under the action of the charger 290, during charging, lithium ions (Li) are released into the electrolyte 280 from the positive electrode active material within the positive electrode active material layer 223. In addition, electric charge is released from the positive electrode active material layer 223. The electric charge that has been released passes through the conductive material (not shown) and is sent to the positive electrode current collector 221, from which it then passes through the charger 290 and is sent to the negative electrode sheet 240. Charge is collected at the negative electrode sheet 240, along with which lithium ions (Li) within the electrolyte 280 are absorbed by the negative electrode active material within the negative electrode active material layer 243 and stored.

Operation During Discharge

Figure 8:
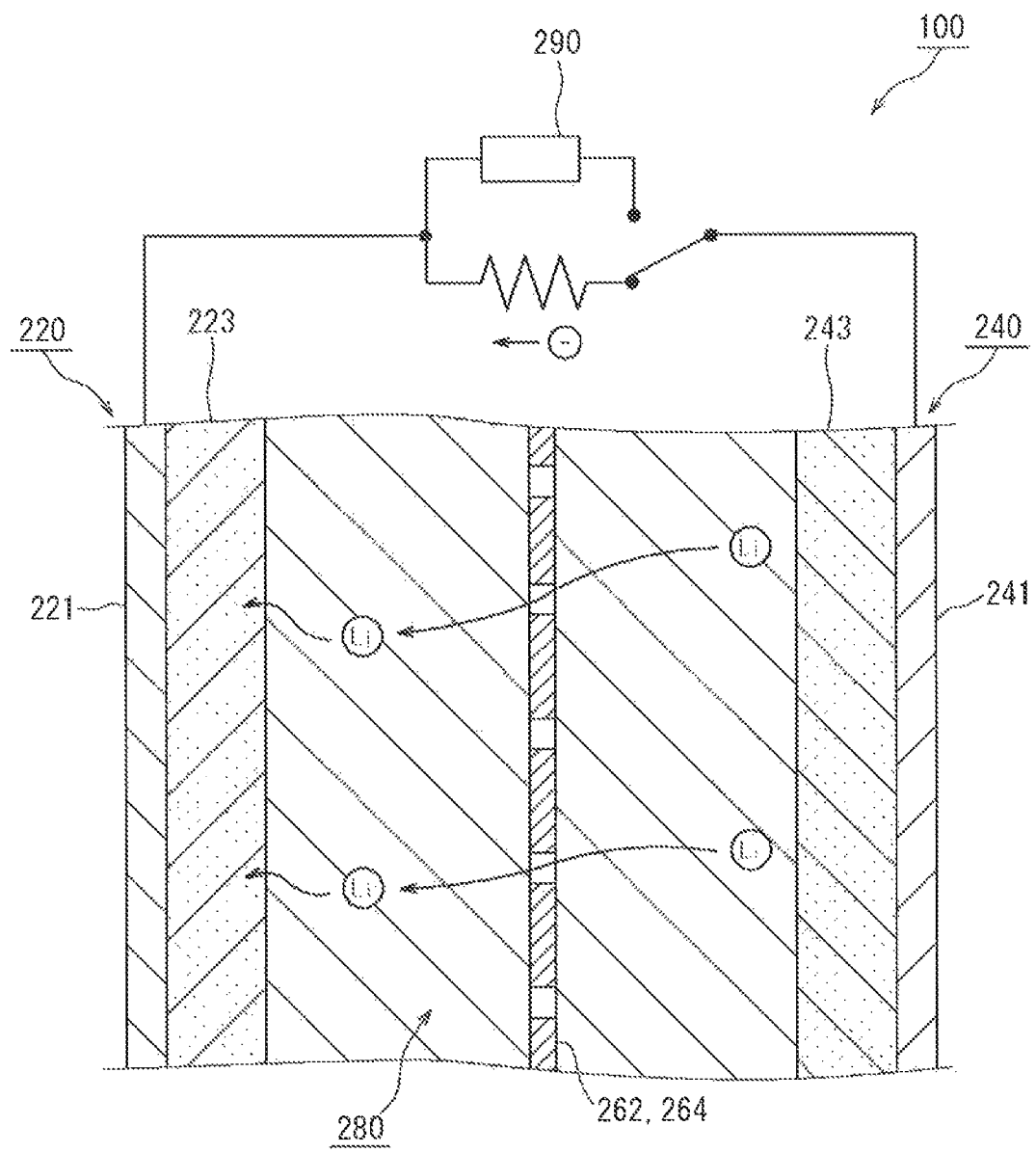
FIG. 8 is a schematic view showing the state of a lithium ion secondary battery during discharging.

FIG. 8 schematically shows the state during discharge of a lithium ion secondary battery 100. During discharge, as shown in FIG. 8, electric charge is sent from the negative electrode sheet 240 to the positive electrode sheet 220, along with which lithium ions that have been stored in the negative electrode active material layer 243 are released into the electrolyte 280. Also, at the positive electrode, lithium ions within the electrolyte 280 are taken up into the positive electrode active material within the positive electrode active material layer 223.

Lithium ions thus move back and forth between the positive electrode active material layer 223 and the negative electrode active material layer 243 by passing through the electrolyte 280 during charging and discharging of the lithium ion secondary battery 100. Also, during charging, electrical charge is sent from the positive electrode active material and to the positive electrode current collector 221 by passing through the conductive material. By contrast, during discharging, electric charge is returned from the positive electrode current collector 221 to the positive electrode active material by passing through the conductive material.

Smoother movement of lithium ions and smoother movement of electrons during charging is thought to enable efficient and rapid charging. Smoother movement of lithium ions and smoother movement of electrons during discharging is thought to lower battery resistance, increase the depth of discharge and increase battery power.

Other Battery Configurations

An example of a lithium ion secondary battery has been described above, although the lithium ion secondary battery is not limited to the foregoing configuration. Also, electrode sheets obtained by similarly coating an electrode mixture onto metal foil may be used in various other battery configurations. For example, other known battery configurations include cylindrical batteries and laminated batteries. Cylindrical batteries are batteries in which the coiled electrode assembly is housed in a cylindrical battery case. Laminated batteries are batteries in which the positive electrode sheet and the negative electrode sheet are laminated together, with a separator therebetween.

A lithium ion secondary battery according to an embodiment of the invention is described below. Because the basic construction in this lithium ion secondary battery is the same as that in the above-described lithium ion secondary battery 100, the following description below makes reference where suitable to the diagrams of the above lithium ion secondary battery 100.

Lithium Ion Secondary Battery 100A

Figure 9:
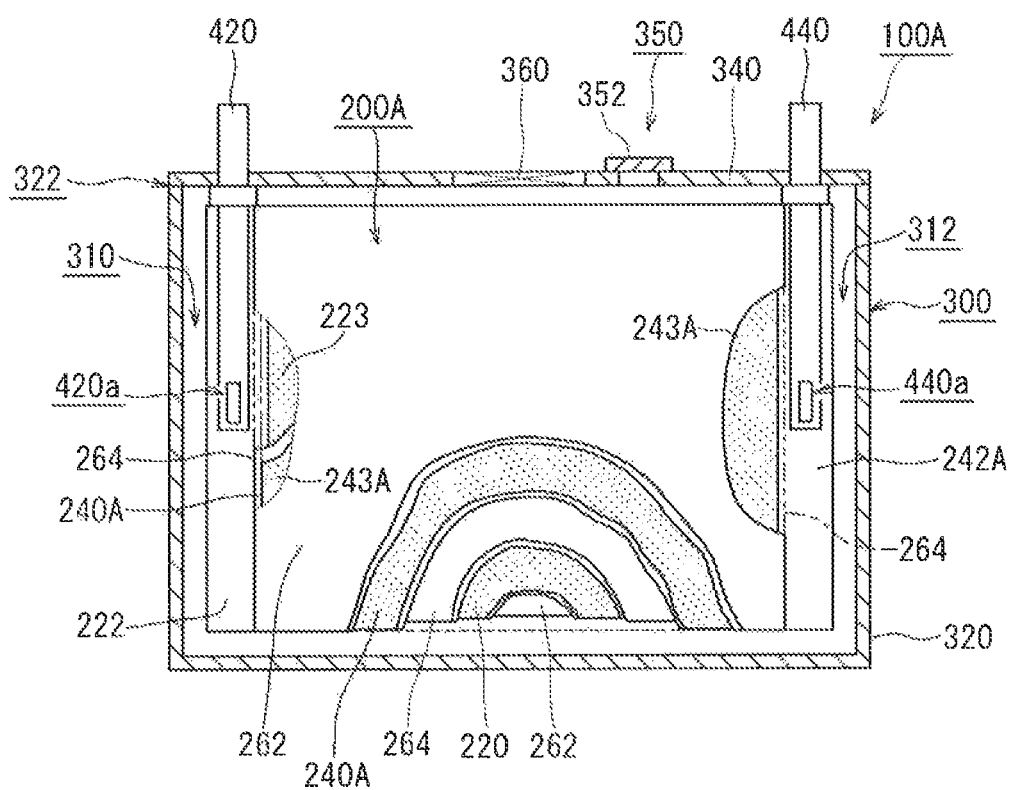
FIG. 9 is a view showing a lithium ion secondary battery according to an embodiment of the invention.
Figure 10:
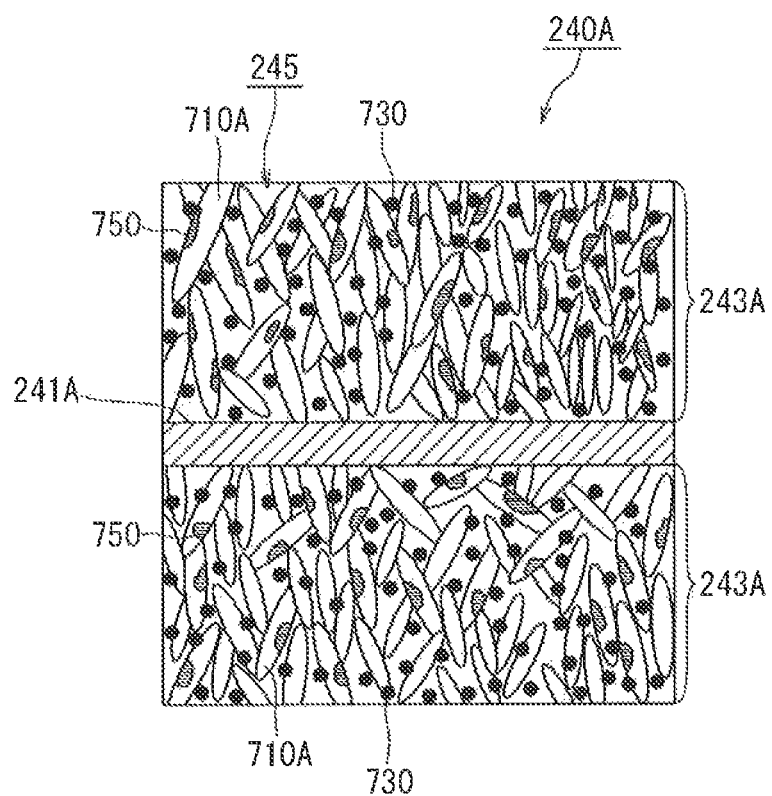
FIG. 10 is a cross-sectional view showing the structure of a negative electrode active material layer in a lithium ion secondary battery according to an embodiment of the invention.

FIG. 9 shows a lithium ion secondary battery 100A according to an embodiment of the invention. In FIG. 9, the structure of the negative electrode sheet 240A in this embodiment of the invention differs from that in the lithium ion secondary battery 100 shown in FIG. 1. The uncoated region of the negative electrode sheet 240A is indicated by the symbol 242A. FIG. 10 is a cross-sectional diagram of the negative electrode sheet 240A in the lithium ion secondary battery 100A. In FIG. 10, the negative electrode current collector of the negative electrode sheet 240A is indicated by the symbol 241A.

In this embodiment, as shown in FIG. 10, graphite particles which are at least partially covered by an amorphous carbon film 750 are included in the negative electrode active material particles 710A within the negative electrode active material layers 243A.

Graphite Particles

Here, graphite particles are used as the nuclei of the negative electrode active material particles 710A covered with an amorphous carbon film 750. These graphite particles are exemplified by natural graphite.

Amorphous Carbon Film 750

The amorphous carbon film 750 is a film composed of an amorphous carbon material. For example, by mixing pitch with the graphite particles that are to serve as the nuclei of the negative electrode active material particles 710A and firing the mixture, graphite particles which are at least partially covered by amorphous carbon film 750 can be obtained.

Here, the weight ratio X of the amorphous carbon film 750 in the negative electrode active material particles 710A may approximately satisfy the condition $0.01 \leq X \leq 0.10$. The weight ratio X of the amorphous carbon film 750 is more preferably such that $0.02 \leq X$, and the upper limit is preferably such that $X \leq 0.08$, and more preferably such that $X \leq 0.06$. Negative electrode active material particles 710A more suitably covered with an amorphous carbon film 750 can thus be obtained.

It is desired that, in lithium ion secondary battery intended for installation in vehicles, the high-rate discharge resistance be kept low and also that the performance be maintained in a service environment at low temperatures of about −30° C. In light of this, the inventor has found it preferable to use, as the negative electrode active material particles 710A, graphite particles which are at least partially covered by an amorphous carbon film 750, which have a TG weight-loss-on-heating onset temperature T1 that satisfies the condition $500°\text{C.} \leq T1 \leq 615°\text{C.}$ and which has a micro-Raman G-band half-width Gly that satisfies the condition $20 \leq Gh \leq 28$.

TG Weight-Loss-On-Heating Onset Temperature T1

Here, "TG weight-loss-on-heating onset temperature T1" refers to the temperature at which, in thermogravimetric analysis (TGA) which uses thermal analysis to measure the change in weight of negative electrode active material particles 710 while controlling (heating) the temperature of the particles, the weight of the negative electrode active material particles 710 begins to decrease.

A commercially available instrument may be used to measure the TG weight-loss-on-heating onset temperature T1. Here, the TG weight-loss-on-heating onset temperature T1 is measured with a thermal analyzer manufactured by Rigaku Corporation (Thermo Plus TG8120). Using this thermal analyzer, the TG weight-loss-on-heating onset temperature T1 was obtained by raising the temperature from room temperature to 1,000° C. at a ramp-up rate of 5° C./min and determining the temperature at which the weight of the negative electrode active material particles 710 begins to fall.

Graphite particles at least partially covered with an amorphous carbon film are used here as the negative electrode active material particles 710. A higher amorphous carbon film crystallinity tends to result in a higher TG weight-loss-on-heating onset temperature T1, and a lower amorphous carbon film crystallinity tends to result in a lower TG weight-loss-on-heating onset temperature T1. Hence, the crystallinity of the amorphous carbon film on these graphite particles can be evaluated based on the TG weight-loss-on-heating onset temperature T1.

Micro-Raman G-band Half-Width Gh

Here, the micro-Raman C band can be understood based on the C peak near 1600 cm$^{-1}$ (G band) in a Raman spectrum obtained by measurement with an ordinary Raman spectrometer. The micro-Raman G-band half-width Gh is the half-width of this G hand. This Gh value serves as an indicator expressing the extent of a peak-shaped function, and signifies here the full width at half maximum (FWHM).

A laser Raman spectrometer manufactured by JASCO Corporation (NRS-1000) was used to measure the micro-Raman G-band half-width Gh. The micro-Raman G-band half-width Gh was measured by using a green laser 532 nm as the excitation light and setting the laser power to 100 mV, the exposure time to 30 seconds, and the measurement wavelength range to from 200 cm$^{-1}$ to 400 cm$^{-1}$.

Influence of TG Weight-Loss-On-Heating Onset Temperature T1 and Micro-Raman G-Band Half-Width Gh The inventor has thought of, as shown in FIG. 10, using graphite particles at least partially covered with an amorphous carbon film 750 as the negative electrode active material particles 710A. A plurality of samples of these negative electrode active material particles 710A were prepared, and the TG weight-loss-on-heating onset temperatures T1 and micro-Raman G-band half-widths Gh for these particles were determined. In addition, lithium ion secondary battery test cells were fabricated using these samples. At this time, aside from the negative electrode active material particles, the lithium ion secondary battery test cells were all given substantially the same construction. For each of these test cells, the discharge resistance rise ratio in high-rate charge/discharge cycling and the reaction resistance at about 30° C. were determined, in addition to which the relationship between the TG weight-loss-on-heating onset temperature T1 and the micro-Raman G-band half-width Gh was determined.

As a result, it was found that when the TG weight-loss-on-heating onset temperature T1 satisfies the condition $500°\text{C.} \leq T1 \leq 615°\text{C.}$ and the micro-Raman G-band half-width Gh satisfies the condition $20 \leq Gh \leq 28$, the high-rate discharge resistance in high-rate cycling can be kept low and the reaction resistance at low temperatures of about −30° C. can be kept low.

In addition, some drivers ride their vehicles only on weekends. Accordingly, it is desirable for lithium ion secondary batteries 100A which are intended for installation in vehicles to retain to some degree their capacity even when left standing for a long period of time. From this perspective, it was found that if the TG weight-loss-on-heating onset temperature satisfies the condition $500°\text{C.} \leq T1 \leq 615°\text{C.}$ and the micro-Raman G-band half width Gh satisfies the condition $20 \leq Gh \leq 28$, the capacity retention ratio when the battery is left standing for a long time is clearly different.

Influence of Linseed Oil Absorption F

The inventor, in the interest of being able to retain such a long-term capacity, further investivated the influence of oil absorption by the negative electrode active material particles 710A of each sample. Oil absorption by the negative electrode active material particles 710A was evaluated here based on the absorption of linseed oil. As a result, in cases where the TG weight-loss-on-heating onset temperature T1 satisfies the condition $500°\text{C.} \leq T1 \leq 615°\text{C.}$ and the micro-Raman G-band half-width Oh satisfies the condition $20 \leq Gh \leq 28$, it is preferable also for the absorption F of linseed oil to satisfy the condition $F \geq 50$ mL/100 g. It is possible in this way for the discharge resistance in high-rate cycling to be kept low, and for the reaction resistance at low temperatures of about −30° C. to be kept low.

In addition, it is desirable for the linseed oil absorption F of the graphite particles to be such that F≤64 mL/100 g. As a result, in cases where the TG weight-loss-on-heating onset temperature T1 satisfies the condition 500° C.≤T1≤615° C. and the micro-Raman G-band half-width Gh satisfies the condition 20≤Gh≤28, the capacity can be kept high when the battery has been left standing for a long time. Here, the linseed oil absorption (mL/100 g) is determined in general accordance with JIS K6217-4 ("Basic Properties of Carbon Blacks for Use in Rubber—Part 4: Method of Determining DBP Absorption"). Here, using linseed oil instead of dibutylphthalate (DBP) as the reagent liquid, the linseed oil is titrated with a constant-rate biuret onto the powder being tested, and changes in viscosity characteristics are measured with a torque detector. The amount of reagent liquid addition per unit weight of the powder being tested which corresponds to 70% of the maximum torque generated was treated as the linseed oil absorption.

Test Cell

The inventor prepared a plurality of samples, for use as the negative electrode active material particles 710A, having differing TG weight-loss-on-heating onset temperatures T1 and micro-Raman G-band half-widths Gh. Test cells were then fabricated using the respective negative electrode active material particles 710A, and the discharge resistance in high-rate cycling, reaction resistance at low temperatures of about −30° C., and capacity retention ratio when the battery is left to stand for a long time were each evaluated.

Negative electrode active material particles 710A having differing weight ratios X of amorphous carbon film 750 in the negative electrode active material particles 710A and differing linseed oil absorptions Y in the negative electrode active material particles 710A were each prepared, and predetermined test cells were fabricated using the respective negative electrode active material particles 710A. The test cells were type 18650 cells having a rated capacity of 250 mAh.

Positive Electrode of Test Cells

An aluminum foil having a thickness of 15 μm was used as the positive electrode current collector in the positive electrode of the test cell. The solids in the positive electrode mixture prepared when forming the positive electrode active material layer were set to a weight ratio of positive electrode active material: conductive material binder=87:10:3. LiNiCoMnO$_2$ (lithium nickel cobalt manganese composite oxide) particles were used as the positive electrode active material, and a common positive electrode active material was used in each test cell. Acetylene black was used as the conductive material, and polyvinylidene fluoride (PVDF) was used as the binder.

Negative Electrode of Test Cells

A copper foil having a thickness of 10 μm was used as the negative electrode current collector in the negative electrodes of the test cells. The solids in the negative electrode mixture prepared when forming the negative electrode active material layer were set to a weight ratio of negative electrode active material:thickener binder=98:1:1. Here, carboxymethylcellulose (CMC) was used as the thickener, and styrene-butadiene rubber (SBR) was used as the binder.

Negative Electrode Active Material Particles 710A of Test Cells

Graphite particles at least partially coated with an amorphous carbon film 750 by mixing pitch together with graphite particles that are to serve as the nuclei of the negative electrode active material particles 710A and firing the mixture were used as the negative electrode active material particles 710A in the test cells (see FIG. 10). Here, negative electrode active material particles 710A of differing TG weight-loss-on-heating onset temperatures T1 and micro-Raman G-band half-widths Gh were used in the respective test cells. Aside from the negative electrode active material particles 710A, the respective test cells were fabricated under the same conditions.

First, predetermined conditioning was carried out on the test cells.

Conditioning

Electrolyte is injected into the test cells built as described above, following which the cells are left to stand for about 10 hours. Once the cell voltage reaches 2.0 V or more, conditioning (initial charging) is carried out. Here, conditioning is carried out by the following Steps 1 and 2.

Step 1: Constant-current charging at 1 C until 4.1 V is reached, followed by 5 minutes of rest.

Step 2: After Step 1, constant-current charging for 1.5 hours, then 5 minutes of rest.

Measurement of Rated Capacity

After the above conditioning, the rated capacity of the test cell is measured. The rated capacity is measured by the following Steps 1 to 3. To keep the influence by temperature here constant, the rated capacity is measured in a 25° C. temperature environment.

Step 1: Constant-current charging at IC until 3.0 V is reached, followed by 2 hours of constant-voltage discharge, then 10 seconds of rest.

Step 2: Constant-current discharge at IC until 4.1 V is reached, followed by 2.5 hours of constant-voltage discharge, then 10 seconds of rest.

Step 3: Constant-current discharge at 0.5 C. until 3.0 V is reached, followed by 2 hours of constant-voltage discharge, then 10 seconds of rest.

Rated Capacity: The discharge capacity in discharge from the constant-current discharge to constant-voltage discharge in Step 3 (CCCV discharge capacity) is treated as the rated capacity. In this test cell, the rated capacity is about 1 Ah.

SOC Adjustment

The state of charge (SOC) is adjusted by Steps 1 and 2 below. Here, SOC adjustment may be carried out following the above conditioning operation and measurement of the rated capacity. Also, to keep the influence by temperature here constant, SOC adjustment is carried out in a 25° C. temperature environment.

Step 1: Charging is carried out from 3V at a constant current of IC, thereby setting the state of charge to about 60% of the rated capacity (SOC 60%).

Step 2: Following Step 1, constant-voltage charging is carried out for 2.5 hours.

The test cell can thus be adjusted to a predetermined state of charge.

Next, in order to evaluate the performances of the respective test cells in which negative electrode active material particles 710A having differing TG weight-loss-on-heating onset temperatures T1 and micro-Raman G-band half-widths Gh, the reaction resistance at −30° C., the capacity retention ratio after 60 days of storage, and the high-rate discharge resistance rise ratio were each determined.

Reaction Resistance at −30° C.

Figure 11:
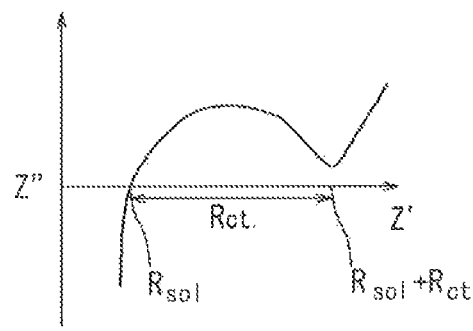
FIG. 11 is a typical image of a Cole-Cole plot (Nyquist plot).

The reaction resistance is determined by an ac impedance measurement method. FIG. 11 is a diagram showing a typical example of a Cole-Cole plot (Nyquist plot) in ac impedance measurement. As shown in FIG. 11, the dc resistance ($R_{sol}$) and the reaction resistance ($R_{ct}$) can be calculated based on the Cole-Cole plot obtained by equivalent circuit fitting in ac impedance measurement. Here, the reaction resistance ($R_{ct}$) can be determined by the following formula.

$$R_{ct}=(R_{sol}+R_{ct})-R_{sol}$$

Such measurement, and the calculation of de resistance ($R_{sol}$) and reaction resistance ($R_{ct}$) can be carried out using a commercial instrument that has been pre-programmed. An example of such an instrument is an electrochemical impedance measuring system available from Solartron. Here, in a −30° C. temperature environment, complex impedance measurement was carried out over a wavelength range of $10^{-3}$ to $10^4$ Hz, based on a test cell that was adjusted to SOC 40% (a state of charge of about 40% of the rated capacity). Moreover, as shown in FIG. 11, the reaction resistance ($R_{ct}$) obtained by equivalent circuit fitting of the Nyquist plot was treated as the "reaction resistance at −30° C."

Capacity Retention Ratio After 60 Days of Storage

The capacity retention ratio (capacity retention ratio following storage) was evaluated based on test cells adjusted to a predetermined state of charge. This is determined here as the ratio between the initial capacity of the test cell adjusted to SOC 80% and the capacity following storage of the test cell adjusted to this predetermined state of charge in a predetermined environment for a predetermined time (suitably referred to below as the "capacity after storage"), which ratio is expressed as (capacity after storage)/(initial capacity). "capacity retention ratio after storage (%)" (capacity after storage)/(initial capacity)×100

Here, the "initial capacity" is the discharge capacity measured based on a test cell adjusted to a SOC of 80% at 25° C. The "capacity after storage" is the discharge capacity measured based on a test cell stored for 60 days in a 60° C. temperature environment following adjustment of the SOC to 80% at 25° C. Here, "discharge capacity" is the cumulative capacity (discharge capacity) measured when a test cell is discharged from 4.1 V to 3.0 V at a constant current of 1 C, then successively discharged at a constant voltage until the combined discharge time becomes 2 hours at 25° C.

High-Rate Discharge Resistance Rise Ratio

Next, the high-rate discharge resistance rise ratio (high-rate discharge deterioration ratio) is determined by subjecting the test cell to the above-described conditioning in a 25° C. temperature environment, then carrying out constant-current discharge up to 3.0 V and subsequently adjusting the test cell to a state of charge (SOC) of 60% (SOC 60%; 60% of rated capacity) by carrying out charging at a constant current and constant voltage. Charging and discharging are then repeated at a high rate, after which the resistance rise ratio of the test cell is measured. To keep the influence by temperature here constant, the high-rate deterioration test is carried out in a temperature environment of about 20° C. to 25° C.

One high-rate charge-discharge cycle consists of (I) to (V) below.

(I) Discharging at a constant current of 30 C for 10 seconds.
(II) 10 seconds at rest.
(III) Charging at a constant current of 5 C for 60 seconds (1 minute).
(IV) 10 minutes at rest.
(V) Measurement of the test cell resistance to discharge in (I) for each cycle.

A single charge-discharge cycle consisting of above (I) to (V) is repeated 4,000 times, during which the test cell is adjusted as described above to SOC 60% every 100 cycles. The high-rate discharge resistance rise rate of the test cell in such high-rate charge/discharge cycling is then calculated based on the ratio $\Omega_E/\Omega_I$ of the resistance $\Omega_E$ measured in the $4,000^{th}$ cycle to the resistance $\Omega_I$ measured in the first cycle.

"high-rate discharge resistance rise ratio (%)"=$\Omega_E/\Omega_1 \times 100$

Samples and Their Evaluation

The inventor prepared a plurality of each type of test cell fabricated using negative electrode active material particles 710 of differing TG weight-loss-on-heating onset temperatures T1 and micro-Raman G-band half-widths Gh. The inventor then measured the reaction resistance at −30° C., the capacity retention ratio after 60 days of storage and the high-rate discharge resistance rise ratio for these test cells in which the negative electrode active material particles 710A had differing TG weight-loss-on-heating onset temperatures T1 and micro-Raman G-band half-widths Gh. Table 1 shows the results of these tests.

TABLE 1

|  | TG weight-loss-on-heating onset temperature T1 (° C.) | Micro-Raman G-band half-width Gh | Linseed oil absorption F (mL/100 g) | Reaction resistance at −30° C. (mΩ) | High-rate discharge resistance rise ratio (%) | Capacity retention ratio after 60 days storage (%) |
|---|---|---|---|---|---|---|
| Sample 1 | 613 | 28 | 51 | 600 | 109 | 87.2 |
| Sample 2 | 609 | 21 | 55 | 616 | 105 | 88.1 |
| Sample 3 | 600 | 25 | 59 | 621 | 106 | 87.9 |
| Sample 4 | 549 | 24 | 53 | 628 | 104 | 87.3 |
| Sample 5 | 540 | 21 | 54 | 604 | 104 | 87.7 |
| Sample 6 | 520 | 23 | 64 | 601 | 109 | 88.3 |
| Sample 7 | 555 | 25 | 68 | 602 | 108 | 83.2 |
| Sample 8 | 528 | 20 | 69 | 622 | 105 | 82.2 |
| Sample 9 | 575 | 24 | 49 | 633 | 121 | 87.7 |
| Sample 10 | 531 | 80 | 52 | 732 | 133 | 86.9 |
| Sample 11 | 523 | 81 | 60 | 722 | 134 | 87.2 |
| Sample 12 | 502 | 79 | 69 | 714 | 131 | 82.1 |
| Sample 13 | 621 | 28 | 53 | 671 | 121 | 88.7 |
| Sample 14 | 652 | 26 | 56 | 683 | 124 | 87.6 |

TABLE 1-continued

|  | TG weight-loss-on-heating onset temperature T1 (° C.) | Micro-Raman G-band half-width Gh | Linseed oil absorption F (mL/100 g) | Reaction resistance at −30° C. (mΩ) | High-rate discharge resistance rise ratio (%) | Capacity retention ratio after 60 days storage (%) |
|---|---|---|---|---|---|---|
| Sample 15 | 661 | 20 | 48 | 691 | 125 | 87.9 |
| Sample 16 | 654 | 24 | 69 | 676 | 119 | 81.1 |

In Sample 1, the negative electrode active material particles 710A had a TG weight loss-on-heating onset temperature T1 of 613° C., a micro-Raman G-band half-width Gh of 28, and a linseed oil absorption F of 51 mL/100 g. The test cell had a reaction resistance at −30° C. of 600 mΩ, a high-rate discharge resistance rise ratio of 109%, and a capacity retention ratio after 60 days of storage of 87.2%.

In Sample 2, the negative electrode active material particles 710A had a TG weight-loss-on-heating onset temperature T1 of 609° C., a micro-Raman G-band half-width Gh of 21, and a linseed oil absorption F of 55 mL/100 g. The test cell had a reaction resistance at −30° C. of 616 mΩ, a high-rate discharge resistance rise ratio of 105%, and a capacity retention ratio after 60 days of storage of 88.1%.

In Sample 3, the negative electrode active material particles 710A had a TG weight-loss-on-heating onset temperature T1 of 600° C., a micro-Raman G-band half-width Gh of 25, and a linseed oil absorption F of 59 mL/100 g. The test cell had a reaction resistance at −30° C. of 621 mΩ, a high-rate discharge resistance rise ratio of 106%, and a capacity retention ratio after 60 days of storage of 87.9%.

In Sample 4, the negative electrode active material particles 710A had a TG weight-loss-on-heating onset temperature T1 of 549° C., a micro-Raman G-band half-width Gh of 24, and a linseed oil absorption F of 53 mL/100 g. The test cell had a reaction resistance at −30° C. of 628 mΩ, a high-rate discharge resistance rise ratio of 104%, and a capacity retention ratio after 60 days of storage of 87.3%.

In Sample 5, the negative electrode active material particles 710A had a TG weight-loss-on-heating onset temperature T1 of 540° C., a micro-Raman G-band half-width Gh of 21, and a linseed oil absorption F of 54 mL/100 g. The test cell had a reaction resistance at −30° C. of 604 mΩ, a high-rate discharge resistance rise ratio of 104%, and a capacity retention ratio after 60 days of storage of 87.7%.

In Sample 6, the negative electrode active material particles 710A had a TG weight-loss-on-heating onset temperature T1 of 520° C., a micro-Raman G-band half-width Gh of 23, and a linseed oil absorption F of 64 mL/100 g. The test cell had a reaction resistance at −30° C. of 601 mΩ, a high-rate discharge resistance rise ratio of 109%, and a capacity retention ratio after 60 days of storage of 88.3%.

In Sample 7, the negative electrode active material particles 710A had a TG weight-loss-on-heating onset temperature T1 of 555° C., a micro-Raman G-band half-width Gh of 25, and a linseed oil absorption F of 68 mL/100 g. The test cell had a reaction resistance at −30° C. of 602 mΩ, a high-rate discharge resistance rise ratio of 108%, and a capacity retention ratio after 60 days of storage of 83.2%.

In Sample 8, the negative electrode active material particles 710A had a TG weight-loss-on-heating onset temperature T1 of 528° C., a micro-Raman G-band half-width Gh of 20, and a linseed oil absorption F of 69 mL/100 g. The test cell had a reaction resistance at −30° C. of 622 mΩ, a high-rate discharge resistance rise ratio of 105%, and a capacity retention ratio after 60 days of storage of 82.2%.

In Sample 9, the negative electrode active material particles 710A had a TG weight-loss-on-heating onset temperature T1 of 575° C., a micro-Raman G-band half-width Gh of 24, and a linseed oil absorption F of 49 mL/100 g. The test cell had a reaction resistance at −30° C. of 633 mΩ, a high-rate discharge resistance rise ratio of 121%, and a capacity retention ratio after 60 days of storage of 87.7%.

In Sample 10, the negative electrode active material particles 710A had a TG weight-loss-on-heating onset temperature T1 of 531° C., a micro-Raman G-band half-width Gh of 80, and a linseed oil absorption F of 52 mL/100 g. The test cell had a reaction resistance at −30° C. of 732 mΩ, a high-rate discharge resistance rise ratio of 133%, and a capacity retention ratio after 60 days of storage of 86.9%.

In Sample 11, the negative electrode active material particles 710A had a TG weight-loss-on-heating onset temperature T1 of 523° C., a micro-Raman G-band half-width Gh of 81, and a linseed oil absorption F of 60 mL/100 g. The test cell had a reaction resistance at −30° C. of 722 mΩ, a high-rate discharge resistance rise ratio of 134%, and a capacity retention ratio after 60 days of storage of 87.2%.

In Sample 12, the negative electrode active material particles 710A had a TG weight-loss-on-heating onset temperature T1 of 502° C., a micro-Raman G-band half-width Gh of 79, and a linseed oil absorption F of 69 mL/100 g. The test cell had a reaction resistance at −30° C. of 714 mΩ, a high-rate discharge resistance rise ratio of 131%, and a capacity retention ratio after 60 days of storage of 82.1%.

In Sample 13, the negative electrode active material particles 710 had a TG weight-loss-on-heating onset temperature T1 of 621° C., a micro-Raman G-band half-width Gh of 28, and a linseed oil absorption F of 53 mL/100 g. The test cell had a reaction resistance at −30° C. of 671 mΩ, a high-rate discharge resistance rise ratio of 121%, and a capacity retention ratio after 60 days of storage of 88.7%.

In Sample 14, the negative electrode active material particles 710A had a TG weight-loss-on-heating onset temperature T1 of 652° C., a micro-Raman G-band half-width Gh of 26, and a linseed oil absorption F of 56 mL/100 g. The test cell had a reaction resistance at −30° C. of 683 mΩ, a high-rate discharge resistance rise ratio of 124%, and a capacity retention ratio after 60 days of storage of 87.6%.

In Sample 15, the negative electrode active material particles 710A had a TG weight-loss-on-heating onset temperature T1 of 661° C., a micro-Raman G-band half-width Gh of 20, and a linseed oil absorption F of 48 mL/100 g. The test cell had a reaction resistance at −30° C. of 691 mΩ, a high-rate discharge resistance rise ratio of 125%, and a capacity retention ratio after 60 days of storage of 87.9%.

In Sample 16, the negative electrode active material particles 710A had a TG weight-loss-on-heating onset temperature T1 of 654° C., a micro-Raman G-band half-width Gh of 24, and a linseed oil absorption F of 69 mL/100 g. The test cell had a reaction resistance at −30° C. of 676 mΩ, a high-rate discharge resistance rise ratio of 119%, and a capacity retention ratio after 60 days of storage of 81.1%.

Hence, in cases where the negative electrode active material particles 710A have a TG weight-loss-on-heating onset temperature T1 such that 500° C.≤T1≤615° C. and have a micro-Raman G-band half-width Gh such that 20≤Gh≤28 (e.g., Samples 1 to 9), the reaction resistance at about −30° C. can be kept low. By contrast, in cases where the negative electrode active material particles 710A have a TG weight-loss-on-heating onset temperature T1 which is not in the range of 500° C.≤T1≤615° C. and have a micro-Raman G-band half-width Gh which is not in the range of 20≤Gh≤28, the reaction resistance at about −30° C. becomes high (e.g., Samples 13 to 16). Moreover, in cases where the negative electrode active material particles 710A, in spite of having a TG weight-loss-on-heating onset temperature T1 such that 500° C.≤T1≤615° C., have a micro-Raman G-band half-width Gh which is not in the range 20≤Gh≤28, the reaction resistance at about −30° C. tends to be even higher (e.g., Samples 10 to 12).

Such a trend indicates that it is desirable for the negative electrode active material particles 710A to have a TG weight-loss-on-heating onset temperature T1 such that 500° C.≤T1≤615° C. and to have a micro-Raman G-band half-width Gh such that 20≤Gh≤28. By selecting the negative electrode active material particles 710A, a lithium ion secondary battery 100A which is capable of keeping the reaction resistance in a low-temperature environment low is obtained.

In this case, the negative electrode active material layer 243A may be set so as to have a TG weight-loss-on-heating onset temperature such that 510° C.≤T1≤605° C. and a micro-Raman G-band half-width Gh such that 21≤Gh≤27. The reaction resistance of the lithium ion secondary battery 100A in a low-temperature environment can thereby be more reliably obtained.

Also, in cases where the negative electrode active material particles 710A have a linseed oil absorption F≥50 mL/100 g, the high-rate discharge resistance rise ratio can be kept low (e.g., Samples 1 to 8). By contrast, in cases where the negative electrode active material particles 710A have a linseed oil absorption F which does not satisfy the condition F≥50 mL/100 g, the high-rate discharge resistance rise ratio tends to be high (e.g., Sample 9). Such a trend indicates that, by selecting negative electrode active material particles 710A which have a linseed oil absorption F such that F≥50 mL/100 g, it is possible to obtain a lithium ion secondary battery 100A in which the high-rate discharge resistance rise ratio can be kept even lower.

In this case, the negative electrode active material particles 710A in the negative electrode active material layer 243A may have a linseed oil absorption F such that F≥52 mL/100 g. The effect of keeping the high-rate discharge resistance rise ratio of the lithium ion secondary battery 100A low can thereby be more reliably achieved.

In cases where the graphite particles have a linseed oil absorption F such that F≤64 mL/100 g, the capacity retention ratio after 60 days of storage can be kept high (e.g., Samples 1 to 6 and Samples 9 to 15). By contrast, in cases where the linseed oil absorption F of the graphite particles does not satisfy the condition F≤64 mL/100 g, the capacity retention ratio after 60 days of storage tends to become low (e.g., Samples 8 and 16). Such a trend indicates that, by selecting negative electrode active material particles 710A having a linseed oil absorption F≤64 mL/100 g, there can be obtained a lithium ion secondary battery 100A which, even when left to stand for a longer period of time, is capable of maintaining a high capacity.

In this case, the negative electrode active material particles 710A in the negative electrode active material layer 243A may have a linseed oil absorption F such that F≤62 mL/100 g. The effect of keeping the capacity high even when the lithium ion secondary battery 100A has been left to stand for a long time can thereby be more reliably achieved.

Hence, the lithium ion secondary battery 100A, as shown in FIG. 10, may have negative electrode active material particles 710A which include graphite particles that are at least partially covered with an amorphous carbon film 750. In this case, it is desirable for the negative electrode active material particles 710A to have a TG weight-loss-on-heating onset temperature T1 such that 500° C.≤T1≤615° C. and to have a micro-Raman. G-band half-width Gh such that 20≤Gh≤28. As a result, a lithium ion secondary battery 100A having an excellent reaction resistance in a low-temperature environment can be obtained. Moreover, the negative electrode active material particles 710A may have a linseed oil absorption F such that F≥50 mL/100 g, thereby making is possible to obtain a lithium ion secondary battery 100A in which the high-rate discharge resistance rise ratio (high-rate discharge deterioration ratio) is kept low. In addition, the negative electrode active material particles 710A may have a linseed oil absorption F such that F≤64 mL/100 g, thereby making it possible to obtain a lithium ion secondary battery 100A which can maintain a high capacity even when left to stand for a long time.

The method of manufacturing a lithium ion secondary battery 100A according to one embodiment of the invention includes: step A of providing negative electrode active material particles 710A, step B of creating a negative electrode mixture of the negative electrode active material particles 710A and a hinder 730 mixed together in a solvent, and step C of coating the negative electrode mixture onto a negative electrode current collector 241A so as to form a negative electrode active material layer 243A on the negative electrode current collector 241A. Here, in Step A, there may be provided a negative electrode active material layer 243A which includes graphite particles that are at least partially covered with an amorphous carbon film, has a TG weight-loss-on-heating onset temperature T1 such that 500° C.≤T1≤615° C., and has a micro-Raman &band half-width Gh. such that 20≤Gh≤28. It is thereby possible to manufacture a lithium ion secondary battery in which the reaction resistance in a low-temperature environment is kept low.

in this case, the negative electrode active material layer 243A provided in Step A may have a linseed oil absorption F such that F≥50 mL/100 g. A lithium ion secondary battery 100A in which the high-rate discharge resistance rise ratio can be kept low is thereby obtained. The negative electrode active material particles prepared in Step A may have a linseed oil absorption such that F≤64 mL/100 g. A lithium ion secondary battery 100A in which the capacity can be kept high even when left to stand for a long time is thereby obtained.

Lithium ion secondary batteries 100A according to embodiments of the invention have been described above, although the lithium ion secondary battery according to this invention is not limited by any of the above-described embodiments.

As described above, this invention helps to enhance the power characteristics of lithium ion secondary batteries. Hence, the lithium ion secondary battery according to this invention is suitable as secondary batteries adapted for use as power sources for driving vehicles, such as batteries for driving hybrid cars, in which the high-rate power characteristics or cycle characteristics are required to be high, and also batteries for driving plug-in hybrid cars or electric cars that are required in particular to have a high capacity.

Figure 12:
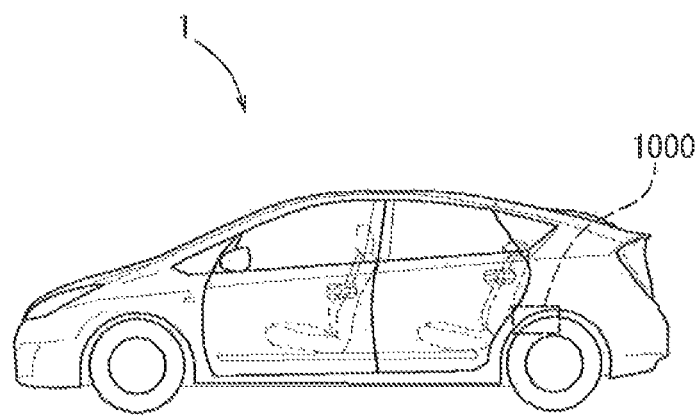
FIG. 12 is a diagram showing a vehicle with secondary batteries on board.

In this case, as shown in FIG. 12, the inventive battery may be advantageously used as a battery 1000 for driving a vehicle, which battery, in the form of a battery pack obtained by connecting and combining a plurality of secondary batteries, drives the motor of a vehicle 1 such as an automobile. In particular, in the embodiments of the invention, the lithium ion secondary battery is able, in a low-temperature environment, to keep the reaction resistance low. Moreover, in a preferred embodiment of the invention, the lithium ion secondary battery can maintain a higher capacity during long-term storage, in addition to which the rise in resistance can be kept low even in high-rate discharge. As a result, the lithium ion secondary battery according to this invention is especially preferred as a battery 1000 for driving vehicles, it is suitable for the lithium ion secondary batteries according to the embodiments of the invention to be, for example, lithium ion secondary batteries having a rated capacity of at least 3.0 A which are adapted for use as batteries for driving hybrid cars (especially plug-in hybrid cars), electric automobiles or the like.

REFERENCE SIGNS LIST

1 Vehicle
100, 100A Lithium ion secondary battery
200 Coiled electrode assembly
220 Positive electrode sheet
221 Positive electrode current collector
222 Uncoated region
223 Positive electrode active material layer
224 Middle portion
225 Gap (cavity)
240, 240A Negative electrode sheet
241, 241A Negative electrode current collector
242, 242A Uncoated region
243, 243A Negative electrode active material layer
245 Gap (cavity)
252 Both sides
262, 264 Separator
280 Electrolyte
290 Charger
300 Battery case
310, 312 Gaps
320 Container body
322 Joint between lid and container body
340 Lid
350 Electrolyte injection hole
352 Sealing cap
360 Safety valve
420 Electrode terminal
420a Tip
440 Electrode terminal
440a Tip
610 Positive electrode active material particle
620 Conductive material
630 Binder
710, 710A Negative electrode active material particles
730 Binder
750 Amorphous carbon film
1000 Battery for driving a vehicle

The invention claimed is:

1. A lithium ion secondary battery, comprising:
negative electrode active material particles comprising graphite particles and being at least partially covered by an amorphous carbon film, wherein
the negative electrode active material particles have a TG weight-loss-on-heating onset temperature T1 that satisfies the condition $500°\,C. \leq T1 \leq 615°\,C.$ and have a micro-Raman G-band half-width Gh that satisfies the condition $20 \leq Gh \leq 28$.

2. The lithium ion secondary battery according to claim 1, wherein
the negative electrode active material particles have a linseed oil absorption F that satisfies the condition $F \geq 50$ mL/100 g.

3. The lithium ion secondary battery according to claim 1, wherein
the negative electrode active material particles have a linseed oil absorption F that satisfies the condition $F \leq 64$ mL/100 g.

4. The lithium ion secondary battery according to claim 1, wherein a weight ratio X of the amorphous carbon film relative to the negative electrode active material particles is in a range of from 0.01 to 0.10.

5. A method for manufacturing a lithium ion secondary battery, the method comprising:
step A of preparing negative electrode active material particles comprising graphite particles that are at least partially covered by an amorphous carbon film, having a TG weight-loss-on-heating onset temperature T1 that satisfies the condition $500°\,C. \leq T1 \leq 615°\,C.$, and having a micro-Raman G-band half-width Gh that satisfies the condition $20 \leq Gh \leq 28$;
step B of forming a negative electrode mixture of the negative electrode active material particles and a binder mixed together in a solvent; and
step C of coating the negative electrode mixture onto a negative electrode current collector so as to form a negative electrode active material layer on the negative electrode current collector.

6. The method according to claim 5, wherein the negative electrode active material particles have a linseed oil absorption F that satisfies the condition $F \geq 50$ mL/100 g.

7. The method according to claim 5, wherein the negative electrode active material particles have a linseed oil absorption F that satisfies the condition $F \geq 64$ mL/100 g.

8. The method according to claim 5, wherein a weight ratio X of the amorphous carbon film relative to the negative electrode active material particles is in a range of from 0.01 to 0.10.

* * * * *